United States Patent
Robinson et al.

(10) Patent No.: US 7,747,528 B1
(45) Date of Patent: Jun. 29, 2010

(54) SYSTEM AND METHOD FOR DELAYING PAYMENT PROCESSING FOR BIOMETRICALLY-INITIATED FINANCIAL TRANSACTIONS

(75) Inventors: Timothy L. Robinson, Reston, VA (US); Bradford R. Schildt, Boulder, CO (US); Tennille V. Goff, Springfield, VA (US); Mark B. Robinson, Norwalk, CT (US)

(73) Assignee: YT Acquisition Corporation, Delray Beach, CA (US)

( * ) Notice: Subject to any disclaimer, the term of this patent is extended or adjusted under 35 U.S.C. 154(b) by 1286 days.

(21) Appl. No.: 10/775,079

(22) Filed: Feb. 11, 2004

(51) Int. Cl.
*G06Q 40/00* (2006.01)
(52) U.S. Cl. .................................................. 705/44
(58) Field of Classification Search ................ 705/44, 705/45
See application file for complete search history.

(56) References Cited

U.S. PATENT DOCUMENTS

| | | | |
|---|---|---|---|
| 5,870,723 A * | 2/1999 | Pare et al. ..................... 705/39 |
| 6,230,148 B1 | 5/2001 | Pare, Jr. et al. | |
| 6,754,640 B2 * | 6/2004 | Bozeman ....................... 705/40 |
| 7,104,443 B1 * | 9/2006 | Paul et al. ..................... 235/380 |
| 7,162,435 B1 * | 1/2007 | Nagano ........................ 705/22 |
| 2003/0078879 A1 * | 4/2003 | Ieshima et al. ................ 705/38 |
| 2003/0093367 A1 | 5/2003 | Allen-Rouman et al. | |
| 2004/0083169 A1 * | 4/2004 | Dentler et al. ................ 705/40 |
| 2006/0178986 A1 * | 8/2006 | Giordano et al. ............. 705/40 |

FOREIGN PATENT DOCUMENTS

JP    2007293752 A    * 11/2007

OTHER PUBLICATIONS

"Hypercom to Team with Veristar on Tokenless Authentication, Payment." EFT Report, New York, vol. 24, No. 10, p. 1, May 16, 2001.*

* cited by examiner

*Primary Examiner*—Susanna M Diaz
(74) *Attorney, Agent, or Firm*—Pepper Hamilton LLP

(57) ABSTRACT

A system and method for providing a flexible credit facility that can delay the processing of financial transactions, including biometrically-initiated financial transactions, is disclosed. Delays in payment processing are determined by considering various factors that can depend on the merchant, the consumer, or the transaction itself. In one embodiment, after a financial transaction has been delayed for a determined period of time, it is then submitted to a financial network such as the Automated Clearing House (ACH) network.

11 Claims, 2 Drawing Sheets

SYSTEM AND METHOD FOR DELAYING PAYMENT PROCESSING FOR BIOMETRICALLY-INITIATED FINANCIAL TRANSACTIONS

FIELD OF THE INVENTION

This application relates generally to a method of delaying payment processing. More particularly, the present invention relates to a method for delaying payment processing for biometrically-initiated financial transactions.

BACKGROUND

Both merchants and consumers are familiar with using credit cards for purchase transactions. This high-interest credit facility provides consumers with an incentive to accelerate purchase decisions on various products and services. In effect, the high-interest credit facility enables consumers to increase purchase amounts as well as the frequency of purchases. Merchants clearly benefit through the increase in the average size of sales as well as the overall amount of sales to particular consumers. As is well known, the high interest rates and substantial late fees associated with credit cards are a significant drawback to the use of credit cards. What is needed therefore is a more flexible credit facility that is beneficial to both consumers and merchants.

SUMMARY

The present invention meets the above-mentioned needs by providing a flexible credit facility that can delay the processing of financial transactions, including biometrically-initiated financial transactions. Delays in payment processing are determined by considering various factors that can depend on the merchant, the consumer, or the transaction itself. In one embodiment, after a financial transaction has been delayed for a determined period of time, it is then submitted to a financial network such as the Automated Clearing House (ACH) network.

Additional features and advantages of the invention will be set forth in the description which follows, and in part will become more fully apparent from the following description and appended claims, or may be learned by practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
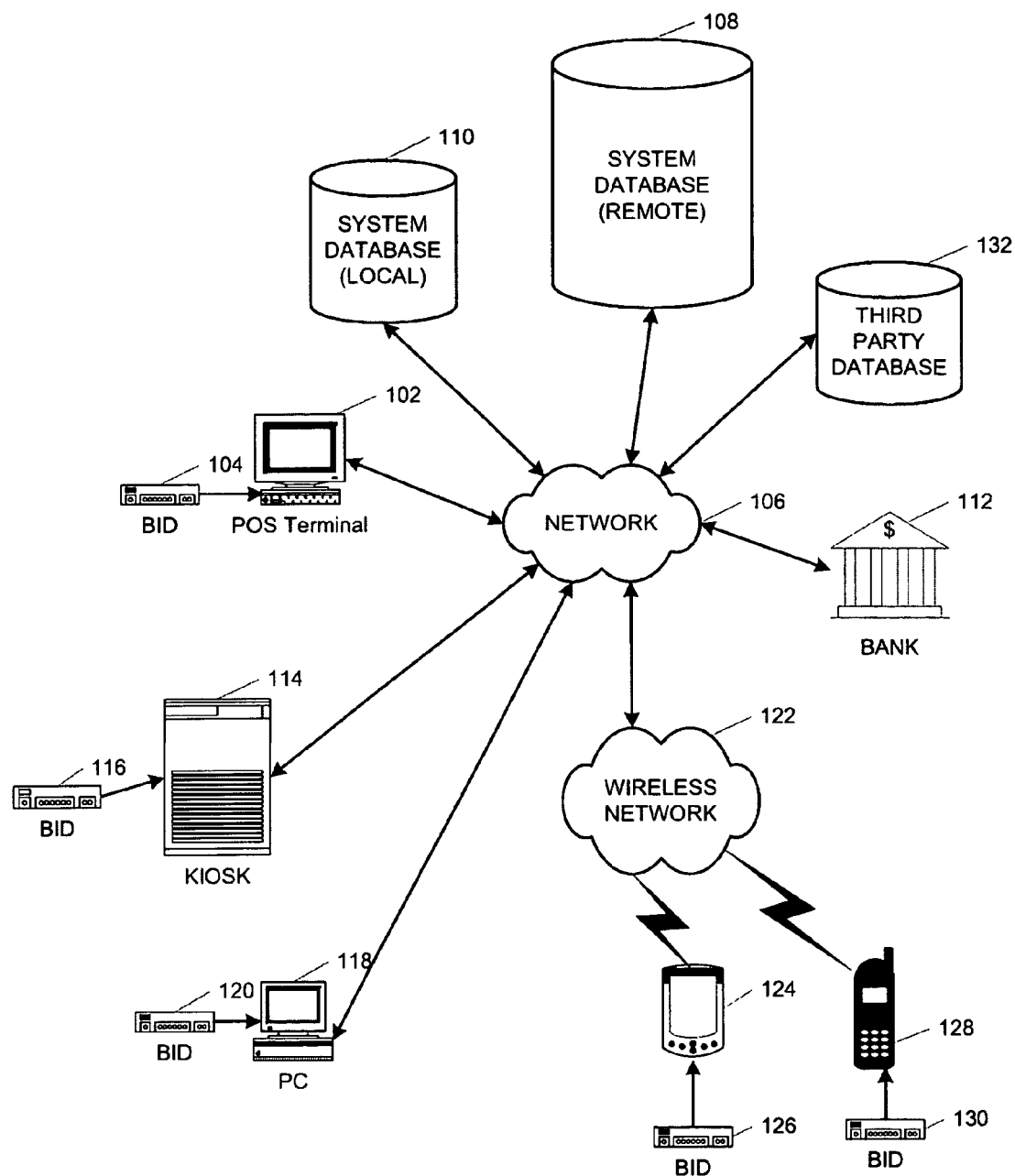
FIG. 1 illustrates a general architecture overview of a system for delaying the processing of payment as part of a biometrically-initiated financial transaction.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, credit cards provide a tremendous benefit to both consumers and merchants through facilitating accelerated purchase decisions permitting delayed payment by the consumer. This delayed payment feature, however, comes at a substantial penalty to the consumer if the credit card provider is not paid in full at the end of the billing cycle. With this credit facility, late fees and high interest rate charges can continue to accrue at an alarming rate, thereby placing a tremendous cost on the consumer.

While merchants benefit from accelerated purchase decisions by consumers, merchants also incur various costs. For example, merchants that accept credit cards must pay a fee (e.g., 1%-2%) to the credit card company for receiving payment through that financial network. These transaction fees can easily become significant in relation to the merchant's expected profit margin. For example, if a merchant's net profit is approximately 2% of its sales, a typical margin for a grocery store, then an expenditure of 1% of gross receipts on fees for processing credit cards is significant.

Other forms of payment by the consumer can also force costs onto a merchant. Debit card payments, for example, typically incur fees that are often as great as credit card fees.

Personal checks also present their own costs. While personal checks do not incur standard processing costs like credit and debit cards, they do produce secondary costs. These secondary costs can occur when payment on a check is refused for insufficient funds, or when the result of consumer fraud. The substantial nature of these secondary costs can provide a strong disincentive for merchants to accept personal checks.

In accordance with the present invention, a new credit facility is provided that avoids the various costs discussed above. As will be described in greater detail below, this new credit facility benefits consumers by providing a deferred payment option without the risk of high interest fees or late payment fees. This new credit facility also benefits merchants by providing a payment mechanism that reduces or eliminates various direct and secondary costs associated with receiving payments.

Direct costs are reduced or eliminated by processing the transaction on a financial network that does not charge the substantial processing fees of credit card or debit card payment networks. Secondary costs are reduced or eliminated by leveraging a user record associated with a biometric sample. In various embodiments, this user record can include information that tracks the consumer's usage history with the biometrically-initiated payment system. Thus, for example, if the user record indicates a usage history containing one or more instances of insufficient funds or fraud, the credit facility can be withdrawn as an option to that particular consumer.

In the following description, the terms "payor" and "payee" can also be used to refer to the parties of a financial transaction. The use of the terms "consumer" and "merchant" is not intended to limit the scope of the present invention.

FIG. 1 illustrates a general architecture overview of an example system 100 for delaying the processing of a biometrically-initiated financial transaction. In one example, a basic transaction utilizes a point of sale (POS) terminal 102 equipped with a biometric input device (BID) 104, a network for communication 106, at least one system database 108, 110, and a bank 112 or other financial institution connected to a financial network for processing the financial transaction.

System database 108, 110 stores consumer information, including at least one biometric sample and information about at least one financial account. This consumer information can be shared with merchants across the system. Various other items of information, including but not limited to a consumer address and telephone number, may also be stored in system database 108, 110. In one embodiment, system database 108, 110 may be partitioned and may be located across multiple physical locations; furthermore, a system may include more than one system database, and such databases would work cooperatively. For example, information pertaining to promotions of specific products may be retrieved from a system database operated by a merchant while instructions for delaying payment processing may be stored on a remote system database that is not operated by the merchant.

System 100 is configured so that one or more system databases 108, 110 are connected to network 106 such as, but not limited to, the Internet. Network 106 comprises connections to at least one device for detecting biometric information and authorizing payment, such as POS terminal 102 with BID 104, kiosk 114 with BID 116, or personal computer 118 with BID 120. In an additional embodiment, other devices and networks are connected to network 106 and are used to authorize transactions. Such networks may include wireless network 122 through which devices such as personal data assistant (PDA) 124 with BID 126 and mobile phone 128 with BID 130 may communicate with network 106. System database 108, 110 can also make use of data received from third party database 132. In various embodiments, third party database 132 can contain information relating to the financial history of the consumer or other information about the consumer that may be used in scoring or otherwise determining whether to allow delayed processing of the financial transaction. Transaction processing instructions are transmitted from system database 108, 110 to bank 112 or any other financial intermediary for processing payments.

In accordance with an embodiment of the present invention, payment for a biometrically-initiated financial transaction is delayed for a period of time, and following the period of delay, payment processing is initiated. A "biometrically-initiated" financial transaction generally refers to a financial transaction in which the consumer provides a biometric sample to be matched against a biometric record in a database. As would be appreciated, the location of the database as well as the specific mechanism by which the biometric sample is matched to a particular biometric record would be implementation dependent and would not be limiting on the scope of the present invention.

The determination of whether to offer a delay and how long of a delay period to offer can be performed automatically by the system. As would be appreciated, the specific mechanism for determining whether and how long of a delay period to offer would be implementation dependent and can be based on a variety of decision inputs.

Figure 2:
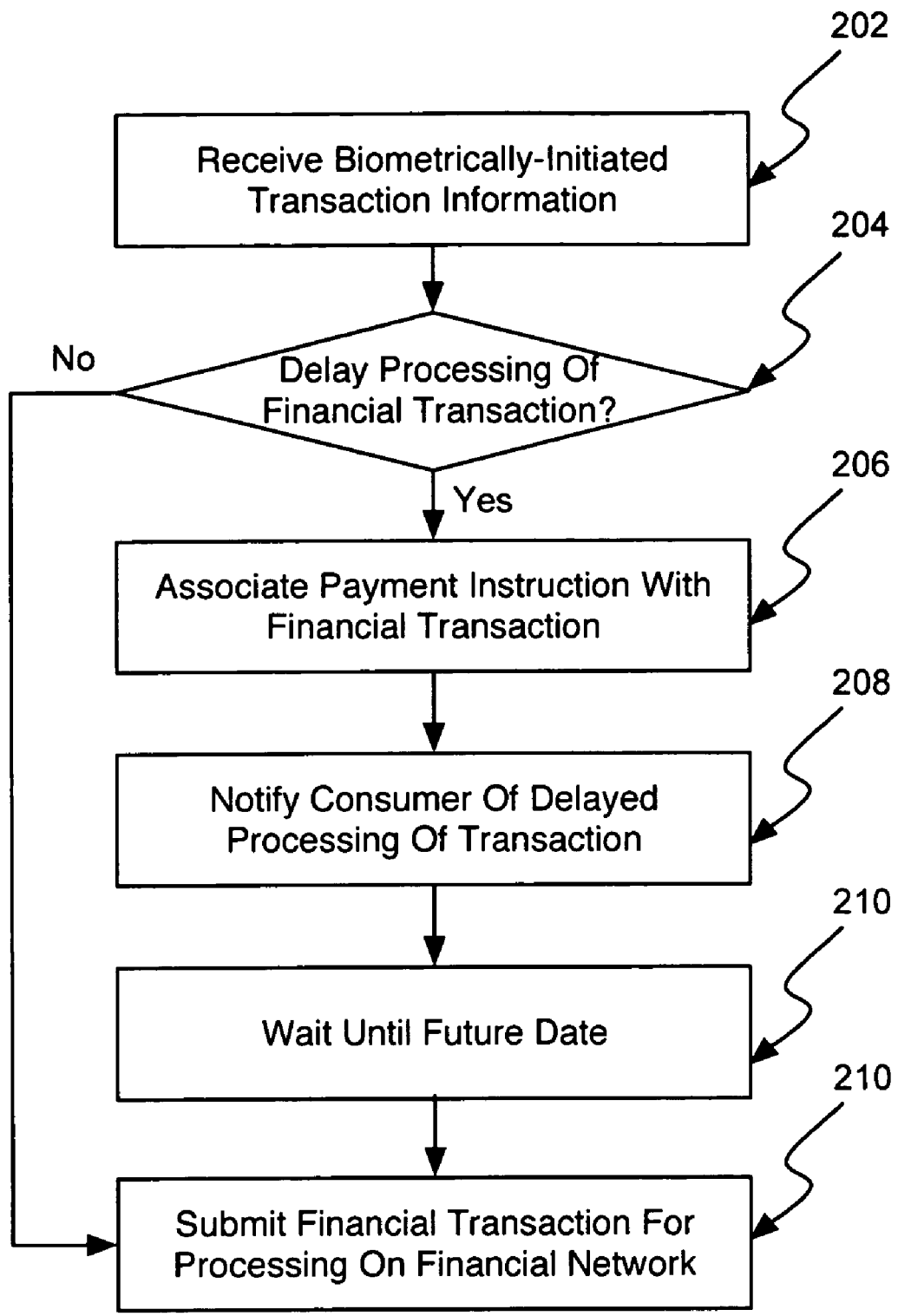
FIG. 2 illustrates a flowchart of a process for delaying the processing of a payment as part of a biometrically-initiated financial transaction.

To illustrate an example process for delaying the processing of a payment as part of a biometrically-initiated financial transaction, reference is made to the flowchart of FIG. 2. As illustrated, the process begins at step 202 where the system receives information regarding a biometrically-initiated financial transaction involving a consumer and a merchant. In this process, a biometric sample (e.g., fingerprint) can be received, for example, by means of a POS terminal 102 equipped with a BID 104.

Upon receipt of the biometrically-initiated financial transaction information, it is then determined, at step 204, whether to apply a period of delay to the processing of the financial transaction. In one embodiment, this period of delay represents a period of time, the expiration of which will result in the financial transaction being processed for payment. As would be appreciated, the specific steps for processing a financial transaction would be implementation dependent.

If, at step 204, it is determined that no period of delay should be applied to the financial transaction, then the financial transaction is cleared for immediate submission for processing on the financial network. In one embodiment, the financial network is represented by the Automated Clearing House (ACH) financial network. As would be appreciated, processing transactions over the ACH network would provide significant cost advantages to merchants because ACH transactions would not be subject to the processing fees charged by credit card or debit card networks.

In general, applying a period of delay to the processing of the financial transaction represents a form of credit. This form of credit is clearly beneficial to the consumer and can be selectively applied. In other words, the extension of this credit facility need not be applied to every consumer or transaction. Rather, only those consumers or transactions satisfying a given set of criteria would qualify for delayed payment.

In one embodiment, the period of delay is determined without input from the consumer. In one example, the period of delay can be predetermined by the merchant in accordance with a predefined sales promotion. Here, a merchant could advertise to the consumers that all financial transactions would be delayed for processing until a given day of the week (e.g., Friday) or month (e.g., $15^{th}$ or $31^{st}$) that would coincide with a time when many consumers would be expecting to deposit a paycheck into an account linked with their biometric user record. These predetermined periods of delay can be defined to be independent of the consumer or the transaction. In other words, the period of delay could be applied regardless of the identity of the consumer or the nature or size of the transaction.

Alternatively, the period of delay can be based on the evaluation of one or more parameters that relate to the consumer or the transaction. Here, the evaluation of various parameters pertaining to the consumer or to the transaction could be used to determine whether and potentially how much to delay processing of payment for the transaction. In various examples, these parameters include one or more of: the identity of the consumer; the amount of the transaction; the products or services being purchased, including any particular combination of goods and services; the date of the transaction; the time of the transaction; the location of the transaction, including identity of the merchant that is providing the goods or services; history of consumer purchase transactions or financial transactions, including purchases from other merchants, credit reports, and payment history; record of membership in a shopping club, which may provide incentives for purchases in accordance with membership terms; affinity of the consumer with any person, group, or entity; or any other parameter that would relate to a merchant's willingness to extend credit to the consumer.

The consideration of a consumer's participation with a club, association, or other affinity organization can be particularly significant because of the potential to produce synergistic effects on sales. For example, delayed payment processing based on an accumulation of shopping club points would enable a merchant to implement programs that reward consumers for making repeated purchases from the merchant. Similarly, delayed payment processing offered in connection with a consumer's membership in an association, club, or other affinity organization would provide further marketing incentives. This sales framework would make possible programs that enable affinity marketing without requiring credit cards or other financial tokens and would eliminate the associated costs of administering card issuance programs.

As would be appreciated, the principles of the present invention are not restricted by the types of information that are evaluated in determining whether to provide delayed payment processing, or in determining how long to delay payment processing. Similarly, the principles of the present invention are not restricted by the location of information that is to be considered. Here, the information to be considered can be possessed by or under control of the merchant, the system operator, or any other third party or source that would provide access to the information. For example, the information to be considered in the delayed payment processing determination can be stored in a local database operated by the merchant, a remote database operated by the system operator, a remote database operated by a third-party, or a combination of local and remote databases.

In a local database embodiment, the information can be stored in a POS terminal or a computer server operated by the merchant. Retrieval of this locally stored information would therefore enable a local evaluation of whether and how long to delay payment processing. In various examples, this locally stored information could include information about a consumer's transaction history with the merchant, information about a particular purchase or sale, information about any merchant-supported promotions, or any other parameter applicable to determining whether and how long to delay payment processing at the local merchant level. As would be appreciated, these items of information could also be stored in a database controlled by a system operator who has been contracted to handle payment processing.

In one embodiment, the system operator is configured to handle biometric authentication and payment processing for a plurality of merchants. In this embodiment, the system operator is configured to store information reflective of a particular consumer's transaction history with a plurality of merchants. This system-wide usage information can also be used in the determination of whether and how long to delay payment processing for a consumer's transaction with a particular merchant. In other words, the consumer's history of credit worthiness as reflected by past transactions within the system governed by the system operator would be particularly relevant in the determination of whether the consumer should receive the benefit of delayed payment processing.

The general issue of credit risk also dictates that either the merchant or the system operator may desire the retrieval of external information reflective of a consumer's standing to receive the benefit of delayed payment processing. In various examples, this external information can be stored in third party database records that are maintained by organizations such as a credit rating agency, a government agency (e.g., department of motor vehicles), or the like. Retrieval of data from a third party database would make available additional information for understanding a consumer's history outside of the system, a potentially key factor in determining whether and how long to delay payment processing. As would be appreciated, data relevant to the determining process could be retrieved from any third party database that includes useful information such as credit scoring, affinity marketing, or the like.

In a further embodiment, a combination of local and remote evaluation of parameters is also possible. Here, a determination process would include inputs from all available sources of information to determine whether and how long to delay payment processing.

In addition to system-determined decisions to extend credit to the consumer, the consumer could also play a role in the determining process. In one embodiment, the system offers the consumer a range of payment options, including delayed payment options, from which the consumer selects to apply to a given transaction. Included within the delayed payment options are fixed periods of delays as well as variable periods of delay that may be defined by the user. In one embodiment, this variable period of delay is chosen by the user from within a bounded range of delay periods. For example, the consumer could specify a period of delay (e.g., by specifying a future date of payment) that would be less than a maximum delay period (e.g., 60 days) determined by the system. This variable option would enable the consumer to plan for a future date of payment that would coincide with their personal financial outlook. Of course, the consumer could always choose an option of payment processing without delay.

The payment options presented to the consumer can be displayed to the consumer in a user interface on POS terminal 102, kiosk 114, or PC 118, as a listing of selectable options. In one embodiment, this range of options can be presented to the consumer during the sales process or at the completion of the purchase. In an alternative embodiment, the range of options is presented to the consumer prior to the initiation of the sales process. In this embodiment, the consumer effectively pre-registers a delayed payment preference in the system. This pre-registered delayed payment preference is then stored in a user record and consulted during the determination process of step 204.

As described, the determination of whether and how long to delay payment processing can be determined dependently or independently of a particular consumer or transaction. In general, this credit facility can be flexibly designed to meet the needs of consumers and merchants in aligning itself with incentives for the consumers and the goals of the merchants. As such, the particular parameters considered and the sources of data utilized by the determination process of step 204 would be implementation dependent. The various examples included in the description of the determination process above are therefore not meant to be limiting of the range of possibilities.

Returning now to the flowchart of FIG. 2, after it is determined that a particular financial transaction should be delayed, at step 206, the system associates a payment instruction with the financial transaction. This association includes storing one or more delay instructions that provide for a delay period that is consistent with the result of the determination of step 204.

Next, at step 208, the system notifies the consumer that the payment processing of the transaction will be delayed. This notification process can be implemented in various ways, including print copies provided at the point of sale, electronic communication through the web, electronic mail, or fax.

At step 210, processing of the financial transaction is delayed in accordance with the associated payment instruction. Finally, at step 212, following the delay period, the system submits the financial transaction for payment processing. In one embodiment, the financial transaction is submitted for payment processing on the ACH network for debiting of the account identified in the consumer's user record. In another embodiment, the consumer is also charged a fee for the provision of delayed payment processing.

Similarly, in another embodiment, a consumer is offered an opportunity to delay processing of payment in exchange for incurring a fee or bearing an interest charge. The consumer would purchase delay of payment, which may be based on the total amount purchased or on purchasing a particular combination of items. If a fee is imposed or interest accrues, then a merchant is enabled to enter into a business relationship with a third party to enable delay of payment processing. The instructions and data necessary to support delayed processing of a financial transaction are transferred from the merchant to the third party according to terms agreed upon by the merchant and the third party.

As thus described, a credit facility can be applied to a financial transaction in a flexible manner. In one embodiment, this credit facility can also be applied to multiple financial transactions. To illustrate this aspect of the present invention, consider a scenario where a consumer makes multiple purchases in a given time period (e.g., day, week, month, etc.). As would be appreciated, the end of the particular time period can be chosen to coincide with a particular calendar period (e.g., day, week, month, year, etc.), or can be chosen to end on an arbitrary date chosen by either the merchant, consumer, or other interested party.

In this multiple-transaction scenario, the multiple purchases are grouped together with payment for each of the multiple purchases being delayed to a common date. For example, if a consumer makes multiple purchases in a given week, payment for each of those purchases is delayed for processing at the end of the week, or if a consumer makes multiple purchases in a given month, payment for each of those purchases is delayed for processing at the end of the month. As noted, any relevant time period can be applied for grouping of multiple transactions and deferred payment processing for those transactions.

To illustrate a potential benefit of the grouping of multiple transactions, consider an example of a biometrically-initiated payment system implemented at a private country club. In this example, assume that the country club includes various member-convenience facilities such as a golf pro shop, a snack bar on the golf course, a snack bar at the clubhouse, and a snack bar at the pool. Assume further that the country club enables each of those facilities to accept biometrically-initiated transactions, and that payment on the multiple biometrically-initiated transactions is deferred to the end of the month, effectively creating a member tab.

This framework provides many benefits to the country club members. First, payment on numerous "small" transactions is simplified. Here, the provision of a biometric sample obviates the need for wallet-based transactions at the various snack bars. Second, in contrast to the collection of individual receipts, the member tab enables an easy end-of-month accounting of expenses incurred. Significantly, this framework also provides significant benefits to the country club. At the end of the month, each member's tab can be generated automatically without relying on extensive end-of-month bill aggregation by the country club staff. Additionally, the country club need not be concerned about unattributable or misbilled charges as the biometric sample assures that each charge is correctly attributed to the proper member account.

As would be appreciated, the delaying of payment processing for multiple transactions can be implemented in various ways. In one embodiment, a separate payment instruction is associated with each transaction. In an alternative embodiment, a single payment instruction is associated with an aggregate purchase amount representing the sum of the multiple transactions. In this embodiment, the single payment instruction would be associated with a running total that is reflective of an "account" that the consumer has effectively established with the merchant.

In contrast to the aggregation of multiple transactions, delayed payment processing can also be applied to a scenario where a single transaction is split into multiple transactions. In one example, this scenario would reflect a merchant's willingness to receive payment on a single purchase in installments over multiple payment periods. For example, the merchant could schedule payment of ½ of the total purchase amount 30 days after the transaction, ¼ of the total purchase amount 60 days after the transaction, and the final ¼ of the total purchase amount 90 days after the transaction. In one embodiment, this installment payment plan could be effected through the creation of multiple payment instructions from a single transaction. Alternatively, a single payment instruction could be used that would include multiple dates that would trigger a submission of a payment request onto the financial network.

As thus described, the principles of the present invention can be used to effect a credit facility that benefits both consumers and merchants. Consumers benefit through the use of a credit facility that does not incur late fees or high-interest charges. Merchants benefit through increased sales without incurring substantial financial processing fees. In particular, direct financial processing fees (e.g., 1-2%) are eliminated through the use of the ACH network, while secondary processing fees of insufficient funds and fraud are reduced through the biometric authorization of consumer transactions.

A mechanism for delaying the processing of a biometrically-initiated financial transaction and delaying the processing of a general financial transaction has been illustrated. It will be appreciated by those skilled in the art that the system and method of the present invention can be used in environments other than those disclosed herein. It will thus be appreciated by those skilled in the art that other variations of the present invention will be possible without departing from the scope of the invention as disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method for conducting a biometrically-initiated financial transaction with delayed processing of payment, the method comprising:

receiving information regarding a tokenless biometrically-initiated financial transaction involving a consumer and a merchant;

receiving, by a computer, a biometric sample;

matching, by a computer, said biometric sample to a particular biometric record of said consumer;

identifying a plurality of non-zero delay periods to offer to the consumer based on the matched biometric record of said consumer;

selecting one of the non-zero delay periods to apply to the processing of the financial transaction, wherein said selecting includes inputting, by said consumer, a specific future date within a bounded range of the plurality of non-zero delay periods;

associating a payment instruction with the financial transaction, said payment instruction providing for a delay period in accordance with said selection;

charging a fee for said delay in processing, said fee being one or more of a fixed sum, a sum equal to a percentage of the financial transaction, and the accrual of interest;

calculating, by a computer, said fee based on the delay period corresponding to the specific future date inputted by the consumer;

delaying the processing of the financial transaction for a period of time in accordance with the selected delay period specified in the payment instruction; and after the period of time has elapsed, initiating payment processing for the financial transaction.

2. The method of claim 1, wherein said receiving comprises receiving a fingerprint.

3. The method of claim 1, wherein said initiating comprises initiating payment processing using the Automated Clearing House network.

4. The method of claim 1, wherein said associating comprises automatically storing on at least one system database instructions for processing the financial transaction.

5. The method of claim 1, wherein said selecting is based on one or more parameters.

6. The method of claim 5, wherein said parameters include one or more of: the identity of the consumer; the date of a transaction; the time of a transaction; the identity of the payee; the location of a transaction; one or more products or services being purchased; the history of one or more consumer purchases, including purchases from multiple payees; the history of one or more consumer financial transactions; one or more records of membership in a shopping club; and one or more records of a consumer's affinity with a person, group or entity.

7. The method of claim 5, further comprising retrieving data about the consumer.

8. The method of claim 5, further comprising accessing data from a third party database.

9. The method of claim 5, wherein evaluation of said parameters occurs locally.

10. The method of claim 1, further comprising communicating said charged fee to the consumer electronically or by printed media.

11. The method of claim 1, wherein said charged fee is collected by the merchant or by a third party.

\* \* \* \* \*